United States Patent [19]

Smith et al.

[11] 3,765,865

[45] Oct. 16, 1973

[54] DESTRUCTION OF COCKLEBUR SEEDS IN COTTONSEED

[75] Inventors: James E. Smith, State College; Avean Wayne Cole; Alvin G. Douglas, both of Starkville, all of Miss.

[73] Assignee: Mississippi State University Development Foundation, Inc., State College, Miss.

[22] Filed: May 28, 1971

[21] Appl. No.: 148,149

[52] U.S. Cl..................................... 71/113, 71/122
[51] Int. Cl............................................... A01n 9/02
[58] Field of Search....................... 71/113, 122, 77

[56] References Cited
UNITED STATES PATENTS
3,202,700   8/1965   Kaczka et al. ......................... 71/113
3,558,682   1/1971   Pappo et al............................ 71/113

OTHER PUBLICATIONS

Shull, "Semipermeability of Seed Coats" (1913) Bot. Gaz. Vol. 56, pp. 169–199 (1913)
Sass, "Botanical Microtechnique" (1966) Iowa St. U. Press (1966)
Blagoveschenskii, "The Action of Succinic Acid on Plants" (1967) CA 68 No. 27182b. (1968)
Brown, "Permeability of Testa of Normal & Teld. Cottonseeds" (1939) CA 34 P. 2883 (1940)

*Primary Examiner*—Lewis Gotts
*Assistant Examiner*—Hollrah G.
*Attorney*—Millen, Raptes and White

[57]     ABSTRACT

Cocklebur seeds in mixtures with cottonseed are selectively destroyed by briefly contacting the seed mixture with an aqueous organic solvent, preferably an acidic mixture of water and a water-miscible organic solvent.

4 Claims, No Drawings

DESTRUCTION OF COCKLEBUR SEEDS IN COTTONSEED

BACKGROUND OF THE INVENTION

This invention relates to a method for selectively killing cocklebur seeds in mixtures with cottonseeds.

The contamination of cottonseed intended for planting with cockleburs has long been recognized as a major problem. The increased use of mechanical pickers and the adoption of strict seed law regulations and certification standards have placed even greater emphasis upon cottonseed contamination in recent years. For example, the Mississippi State Seed Act established five cockleburs as the maximum allowed number per pound of cottonseed. Georgia and South Carolina prohibit cocklebur contamination.

Shaw and Franks, The Cotton Gin and Oil Mill Press, 59(9): 10-11 (1958), approached the problem by designing a flannel-covered sponge roller to which the spiny cockleburs would adhere before exposure to the gin saws, and then be brushed off and discharged. Seed cotton, being relatively smooth, did not adhere to the roller and therefore, a separation was possible. However, cocklebur removal efficiency for this device was only 75 percent.

The relative non-flowability of mechanically-delinted cottonseed is the major obstacle to effective separation from contaiminating cockleburs. In order to remove sufficient cockleburs from mechanically-delinted cottonseed to meet the acceptable contamination level in cottonseed containing more than five cockleburs per pound, an efficiency greater than 90 percent would have to be achieved. No such system has yet been developed.

Shull, Bot. Gaz., 56:159 (1913) reported that cocklebur seed became excessively swollen and were dead within a few hours in 70, 50 and 35 percent alcohol. He also found that other alcohols, ether, and acetic acid entered the cocklebur seed very rapidly.

Bain, D.C., Thesis (M.S.) Texas A & M College, College Station, Texas (1937), applied a solution of mercuric chloride in 50 percent alcohol (1/1,000) to acid-delinted cottonseed for two minutes to obtain disease control. The addition of this solution had no significant effect on cottonseed germination.

Farmer's Fluid, which consist of 3 parts of absolute ethyl alcohol and 1 part glacial acetic acid, kills protoplasm by rapid and violent dehydration. Sass, Botanical Microtechnique, Iowa State University Press (1966), reports that the fluid kills rapidly because of its ability to penetrate rapidly (instantaneous dip to 10 minutes). He states that any killing formula should be regarded as a starting point for experiments, with the determination of the proper balance of ingredients as ultimately important for specific formulations.

It is an object of this invention to provide a method of killing cocklebur seeds in mixtures with cottonseeds. It is another object to provide such a method which does not affect the cottonseeds. It is a further object to provide such a method which is economical and adaptable to conventional cottonseed treating operations. Other objects will be apparent to those skilled in the art to which this invention pertains.

SUMMARY OF THE INVENTION

Cocklebur seeds in cottonseed are effectively killed by briefly contacting the cottonseed with an effective amount of aqueous organic solvent.

DETAILED DISCUSSION

The solvents employed in the process of this invention are aqueous, i.e., they consist at least about 10 percent, preferably at least about 20 percent, and most preferably at least about 30 percent of water. To ensure rapid killing of the cocklebur seed, the solvent mixture preferably is at least about 10 percent, more preferably at least about 20 percent and most preferably at least about 50 percent organic.

The organic portion of the aqueous solvent is preferably a liquid organic compound or a mixture of compounds having a molecular weight of less than about 100, more preferably less than about 75. Specific examples are alkanols, preferably of 1–4 carbon atoms, alkanoic acids, preferably containing 1–4 carbon atoms, esters thereof, preferably containing a total of up to 6 carbon atoms, the corresponding amides, ketones, e.g., acetone, methylethyl ketone, and amines, e.g., lower-alkylamines di-lower-alkylamines and tri-lower-alkylamines, etc. The organic portion is preferably at least partially water soluble. However, water immiscible solvents, e.g., methyl and ethyl acetate can also be employed. To aid in the dispersion of the organic phase in the aqueous phase and/or increase the speed of seed wet-out, wetting agents and/or detergents can be incorporated in the mixture, e.g., sodium dodecylbenzenesulfonic acid, quaternary ammonium cationics and the non-ionic wetting agents.

A preferred class of solvents are aqueous mixtures of acetic acid and methanol and ethanol. The respective proportions of these components are preferably about 5–20 percent; 20–50 percent; and the remainder, i.e., 75–30 percent, water. These have outstanding kill rates.

The amount of aqueous solvent employed, i.e., the ratio to the seed mixture, is not critical. An amount sufficient to ensure contact with all the cocklebur seeds in the mixture should be employed, e.g., 1,500 to 5,000, preferably 2,000 to 3,000 ml/lb. of seed. Much larger amounts can be employed but do not enhance the results obtained. Although solvent mixture can be sprayed, e.g., as a fog or fine mist, onto the seeds, best results are obtained by soaking the seeds in an excess of solvent.

The process is amenable to continuous operation and therefore can be incorporated into conventional cottonseed treatments. To reduce the time required to obtain maximum kills, the solvent mixture can be applied hot, e.g., at up to 100° C.

The time of contact required to obtain maximum kill is dependent in part on the composition of the solvent mixture but relatively little on the temperature of application. Generally, contact time of less than about 15 minutes, e.g., 15 seconds to 10 minutes, preferably 30 seconds to 5 minutes, are employed.

After the maximum kill is achieved, the solvent mixture can be removed by washing with water and/or evaporation, e.g., at room or elevated temperature. When using elevated temperatures during solvent contact or removal, care should be taken not to heat the cottonseed to a temperature which reduces its viability or germination rate.

EXAMPLES

Seed Material

Mechanically-delinted cottonseed was used in these examples. Cottonseed of the Coker 201 variety obtained from experimental plots (1969 cotton variety test at State College) were acid-delinted by hand. Deltapine 16 (acid delinted) and McNair 1032 (mechanically delinted) were obtained from a commercial seed source. Despined cockleburs were added to cottonseed in order to provide controlled mixtures. Seed mixtures ranged from 100 to 350 cottonseed with 50 to 150 cockleburs.

Treatment Application

The cottonseed and cockleburs were mixed thoroughly, exposed to the selected solvent mixture for a certain period of time, and then allowed to dry at room temperature for 24 to 48 hours. A tap water rinse sometimes preceded the drying period.

Killing Formulae

Several concentrations were used to obtain the proper ratio or percentages described herein. The chemical percentages which offered the best selectivity are set forth below.

Ethyl acetate, methyl acetate, ethanol, methanol, acetic acid and mixtures thereof were tested for their selective reduction of cocklebur germinability in cottonseed. All chemicals were applied in distilled water.

| Chemical Treatment | Percent Concentration | Time Exposed |
|---|---|---|
| A. Ethyl acetate | 20 | 3,5,7,10,12,15 minutes |
| B. Methyl acetate | 20 | 5,10,15 minutes |
| C. Methanol + Acetic acid | 35 / 15 | 10,12,15 minutes |
| D. Methanol + Acetic acid | 50 / 20 | 15,30 seconds |
| E. Ethanol + Acetic acid | 50 / 20 | 15,30 seconds |

Seed mixtures were placed in a cylindric screen container 2-½ inches in diameter and 3 inches in length. The container was then placed into a beaker which contained the chemical treatment. Treatments D and E received a 30 second rinse after the treatment. All treatments were dried with paper towels to remove excess solvent.

The seed mixture for each treatment exposure was separated after the treated seed mixture has dried (24–48 hours). Cottonseed were planted in flats under greenhouse conditions, in randomized complete block designs, with the exception of chemical treatment C, which was placed in a completely randomized design. All treatment time exposures were replicated 4 times. Plant counts and shoot dry weights were determined after 3 weeks. A tetrazolium test was conducted to estimate viability and damage for 50 cottonseed for each treatment time exposure. A standard germination test was conducted for treatments D and E and counts made at the end of the 4th and 7th day.

Cockleburs were planted 10 to a flat with the cottonseed in chemical treatments B, D, and E. Cocklebur germination was observed for 2 weeks after cotton plants were harvested.

Cocklebur embryos were planted, as lower and upper emobryos, in separate pots (4 inch plastic pots) for chemical treatments C, D, and E. The pots were placed in a randomized complete block design with 4 replications in a growth chamber. Germination was observed for 2 weeks.

Cocklebur seed viability as tested by tetrazolium salt was determined for at least 50 lower and 50 upper seeds per treatment exposure time.

Tetrazolium Test

Tetrazolium salt (2,3,5-triphenyl tetrazolium chloride) was used throughout this study to test for seed viability of cottonseed and cocklebur seeds.

Since no specific method for determining cocklebur seed viability has been published, a modified procedure based on the tetrazolium test employed with other related seeds was used.

Removal of the seeds from the burs by a longitudinal cut was the first step for the tetrazolium viability test. Once the seeds (lower and upper) were removed, they were placed into separate containers with water. Imbibition of water was necessary to enable the removal of the seed coat without damaging the embryo which in turn allowed absorption of tetrazolium. After the seeds were exposed to water for 45–60 minutes, the seed coats were removed by pinching the seed between the thumb and finger. The embryos were than washed 2 or 3 times in distilled water and placed in a 1 percent tetrazolium chloride solution for 90 minutes at 40° C. Embryos were again washed at the end of the 90 minutes to eliminate further staining of the tissue.

The procedure for cottonseed germination and interpretation of viability were performed as described by Delouche et al., Miss. Agr. Exp. Sta. Tech. Bull. 51 (1962).

As shown in the tables below, cocklebur fruits were readily penetrated by the aqueous solvents, killing them rapidly, whereas cottonseed, with its restricting palisade tissue, gave protection to cottonseed embroyos against the solvents.

Experiment A

The data in Table I show that cocklebur seed viability was markedly reduced by a 20 percent dispersion of ethyl acetate in water. Reductions of 95.8 and 83.3 percent for lower and upper cocklebur seed, respectively, were observed for the 15 minute exposure time as shown by tetrazolium salt procedure.

Cottonsed tested with tetrazolium showed no visible damage when compared to a check. To substantiate the tetrazolium test, cottonseed germination was tested and shown not to differ significantly from the check. Average shoot dry weight per plant gave additional evidence the cottonseed were not damaged.

Experiment B

Methyl acetate (20 percent) in water also gave high reduction percentages of cocklebur seed viability in cottonseed. The data in Table II show a 91.7 and 95.8 percent reduction for lower and upper cocklebur seeds, respectively, for the 15 minute exposure. Soil germination to supplement the tetrazolium test gave cocklebur germination significantly lower than the check for all time exposures. The 15 minute time exposure reduced cocklebur germination 84.2 percent relative to the check, which only germinated 47.5 percent.

TABLE I

[Selective reduction of cocklebur seed viability in cottonseed with (20%) ethyl acetate in water]

| Time exposed (min.) | Cocklebur | | | | Cottonseed | |
|---|---|---|---|---|---|---|
| | Seed viability,[1] no. germ./50 seeds | | Percent reduction | | Germination [2] (in soil) | Average shoot dry weight/ plant (grams) |
| | Lower | Upper | Lower | Upper | | |
| 3 | 11 | 15 | 77.1 | 68.7 | [3] 20.75a | [3] .143a |
| 5 | 4 | 14 | 91.7 | 70.8 | 22.25a | .131ab |
| 7 | 5 | 7 | 89.6 | 85.4 | 20.75a | .130ab |
| 10 | 7 | 10 | 85.4 | 79.2 | 20.75a | .128b |
| 12 | 3 | 11 | 93.7 | 77.1 | 20.25a | .143a |
| 15 | 2 | 8 | 95.8 | 83.3 | 19.75a | .141ab |
| Check | 48 | 48 | 0 | 0 | 22.25a | .135ab |

[1] Viability indicated by tetrazolium salt.
[2] Average number from 4 replications of 25 each.
[3] Duncan's New Multiple Range Test, probability .05.

TABLE II

[Selective reduction of cocklebur seed viability in cottonseed with (20%) methyl acetate in water]

| Time exposed (minutes) | Cocklebur | | | | | | Cottonseed | |
|---|---|---|---|---|---|---|---|---|
| | Seed | | | | Burs | | | |
| | Seed viability,[1] no. germ./50 seeds | | Percent reduction | | Germination of cockleburs [2] | Percent reduction (cockleburs) | Germination [3] (in soil) | Average shoot dry weight/ plant (grams) |
| | Lower | Upper | Lower | Upper | | | | |
| 5 | 15 | 17 | 68.7 | 64.6 | [4] 2.50b | 47.6 | [4] 10.25ab | [4] .092c |
| 10 | 7 | 9 | 85.4 | 81.2 | 1.48bc | 68.8 | 7.25b | .096bc |
| 15 | 4 | 2 | 91.7 | 95.8 | .75c | 84.2 | 11.00ab | .095bc |
| Check | 48 | 48 | 00. | 00. | 4.75a | 00. | 10.75ab | .095bc |

[1] Viability indicated by tetrazolium salt.
[2] Average number germinating in 4 replications of 10.
[3] Average number germinating in 4 replications of 25.
[4] Duncan's New Multiple Range Test, probability .05.

TABLE III

[Methanol (35%) plus acetic acid (15%) in water as a selective means to reduce cocklebur seed viability in cottonseed]

| Time exposed (minutes) | Cocklebur | | | | | | | | Cottonseed | |
|---|---|---|---|---|---|---|---|---|---|---|
| | Seed | | | | Embryos | | | | | |
| | Seed viability,[1] no. germ./50 seeds | | Percent reduction | | Germination of cocklebur embryos [2] | | Percent reduction | | Germination [3] (in soil) | Average shoot dry weight/ plant (grams) |
| | Lower | Upper | Lower | Upper | Lower | Upper | Lower | Upper | | |
| 5 | 1 | 4 | 97.9 | 91.7 | 1.25b | [4] 1.75b | 82.1 | 75.8 | [4] 16.75a | [4] .134a |
| 10 | 0 | 2 | 100.0 | 95.8 | 1.00b | 1.75b | 85.7 | 75.8 | 16.75a | .140a |
| 15 | 0 | 3 | 100.0 | 93.7 | .50b | .50b | 92.9 | 92.9 | 17.50a | .122a |
| Check | 48 | 48 | 00 | 00 | 7.00a | 8.25a | 00 | 00 | 20.50a | .124a |

[1] Viability indicated by tetrazolium salt.
[2] Average number germinating in 4 replications of 10.
[3] Average number germinating in 4 replications of 25.
[4] Duncan's New Multiple Range Test, probability .05.

upper seed, respectively, at the 15 minute time exposure when tested by tetrazolium salt. A good germination correlation was obtained when cocklebur embryos were tested for germinability in soil. Cocklebur embryo germination was reduced 92.9 percent for the lower and upper seeds when compared to the check.

A slight reduction in germination of cottonseed was shown, but was judged to be non-significant. Tetrazolium results on cottonseed showed no reduction in cottonseed viability when compared to the check. Differences in average shoot dry weight per plant were not significant. These data establish that cocklebur seed viability can be reduced to an acceptable level in contaminated cottonseed without appreciable cottonseed damage.

No damage to cottonseed was observed when tested with tetrazolium salt. Cottonseed which were planted in the green-house were accidentally subjected to temperatures in the low 40's for 2 nights, which delayed germination for one week. The data in Table II show that treated cottonseed germination did not differ significantly from the check, and average shoot dry weight per plant did not differ significantly from the check.

This data clearly demonstrates that 90 percent or better reduction in lower and upper cocklebur seed viability can be obtained without damage to cottonseed.

Experiment C

The data in Table III show outstanding reduction of cocklebur seed viability in cottonseed with methanol, acetic acid, and water mixtures. Cocklebur seed viability was reduced 100 and 93.7 percent for the lower and Experiment D Cocklebur seed viability was greatly reduced by treatment with methanol and acetic acid at 50 and 20 percent concentrations, respectively, in water. Table IV shows that a 93.7 percent reduction in viability was obtained, as tested by tetrazolium, for both the lower and upper cocklebur seeds when mixtures were exposed for 30 seconds. Germination of cocklebur embryos was also significantly reduced which substantiates the tetrazolium results. An 85.3 and 79.4 percent reduction in germination for the lower and upper cocklebur embryos, respectively, was obtained for the 30 second exposure. Cocklebur germination reduction from planted burs was comparable to the reduction in cocklebur embryo germination.

Cottonseed damage was not detected when germinated in a soil medium or by the standard germination procedure. Average shoot dry weight per plant was not significantly affected by any treatment. The tetrazolium test showed the cottonseed were slightly damaged on the chalazal end visible as a small cap, but this injury has no effect on cottonseed viability. Failure to rinse the seed mixture after exposure was found to increase cottonseed damage slightly over the rinsed treatment.

which were dead tissue as shown by the tetrazolium. The affected area was very limited and non-significant as is shown in Table V.

TABLE IV

[Reduction of cocklebur seed viability in cottonseed selectively with the use of (50%) methanol and (20%) acetic acid in water]

| | Cocklebur | | | | | | | | | | Cottonseed | | |
|---|---|---|---|---|---|---|---|---|---|---|---|---|---|
| | Seed | | | | Embryos | | | | Burs | | | | |
| Time exposed (seconds) | Seed viability,[1] no. germ./50 seeds | | Percent reduction | | Germination of cocklebur embryos [2] | | Percent reduction | | Germination of cockleburs [2] | Percent reduction (burs) | Germination [3] (in soil) | Germination [4] (std. germ.) | Average shoot dry weight/ plant (grams) |
| | Lower | Upper | Lower | Upper | Lower | Upper | Lower | Upper | | | | | |
| 15 | 6 | 10 | 87.5 | 79.2 | [5] 1.00b | [5] 1.25b | 85.2 | 85.3 | [5] 1.00bc | 87.1 | [5] 11.50ab | [5] 44.00a | [5] .092c |
| 30 | 3 | 3 | 93.7 | 93.7 | 1.00b | 1.75b | 85.2 | 79.4 | 1.48bc | 80.9 | 12.25ab | 42.00a | .099ab |
| Check | 48 | 48 | 00 | 00 | 6.75a | 8.50a | 00 | 00 | 7.75a | 00 | 10.75ab | 42.25a | .095bc |

[1] Viability indicated by tetrazolium salt.
[2] Average germinating in 4 replications of 10.
[3] Average number germinating in 4 replications of 25.
[4] Average number germinating in 4 replications of 50.
[5] Duncan's New Multiple Range Test, probability .05.

TABLE V

[Selective reduction of cocklebur seed viability in cottonseed with (50%) ethanol and (20%) acetic acid in water]

| | Cocklebur | | | | | | | | | | Cottonseed | | |
|---|---|---|---|---|---|---|---|---|---|---|---|---|---|
| | Seed | | | | Embryos | | | | Burs | | | | |
| Time exposed (seconds) | Seed viability,[1] no. germ./50 seeds | | Percent reduction | | Germination of cocklebur embryos [2] | | Percent reduction | | Germination of cockleburs [2] | Percent reduction (burs) | Germination [3] (in soil) | Germination [4] (std. germ.) | Average shoot dry weight/ plant (grams) |
| | Lower | Upper | Lower | Upper | Lower | Upper | Lower | Upper | | | | | |
| 15 | 0 | 1 | 100 | 97.9 | [5] .25b | [5] .25b | 96.3 | 97.1 | [5] .50c | 89.8 | [5] 12.50ab | [5] 44.25a | [5] .103a |
| 30 | 0 | 0 | 100 | 100 | .25b | .25b | 96.3 | 97.1 | .25c | 94.8 | 15.00a | 41.00a | .097b |
| Check | 48 | 48 | 00 | 00 | 6.75a | 8.50a | 00 | 00 | 4.75a | 00 | 10.75ab | 42.25a | .095bc |

[1] Viability indicated by tetrazolium salt.
[2] Average germinating in 4 replications of 10.
[3] Average number germinating in 4 replications of 25.
[4] Average number germinating in 4 replications of 50.
[5] Duncan's New Multiple Range Test, probability .05.

Experiment E

The data in Table V show that cocklebur seed viability can be selectively reduced in cottonseed with (50 percent) ethanol and (20 percent) acetic acid in water. Tetrazolium results showed 100 percent reduction in viability in both the lower and upper cocklebur seeds when a cocklebur and cottonseed mixture was exposed for 30 seconds. Germination of cocklebur embryos gave additional information on the high reduction of cocklebur seed viability. This information was shown to correlate closely with the tetrazolium test, since 96.3 and 97.1 percent reduction in germination for the lower and upper embryos, respectively were obtained with the treatment. The data also show that cocklebur germination from planted burs was reduced 94.9 percent for the 30 second exposure when compared to the check.

Treated cottonseed performed better than the check in many instances. Cottonseed germination in a soil medium gave higher germination for the treated seed than for the check. Average shoot dry weight per plant gave similar results. Standard germination tests showed no significant difference in treated and non-treated cottonseed. Although no significant differences were obtained in germination or shoot dry weight, cottonseed occasionally had minute caps on the chalazal end The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A method of rapidly and selectively killing cocklebur seeds in mixtures with cottonseeds which comprises contacting the mixture of seeds with an aqueous organic solvent mixture comprising a substantial amount of water and at least 15 percent of acetic acid and at least 35 percent of methanol or ethanol, in an amount sufficient to contact the cocklebur seeds in the seed mixture for an effective period of time less than 15 minutes to selectively kill substantially all of the cocklebur seeds, and thereafter removing the organic solvent.

2. A method according to claim 1 wherein the solvent mixture comprises methanol.

3. A method according to claim 1 wherein the seed mixture is contacted with the aqueous organic solvent for from about 15 seconds to 10 minutes.

4. A method according to claim 1 wherein the seed mixture is contacted with the aqueous organic solvent for from about 30 seconds to 5 minutes.

* * * * *